Sept. 5, 1939.  H. M. HAY  2,171,553
COILING CORD AND COILER
Filed Sept. 22, 1933   2 Sheets-Sheet 2
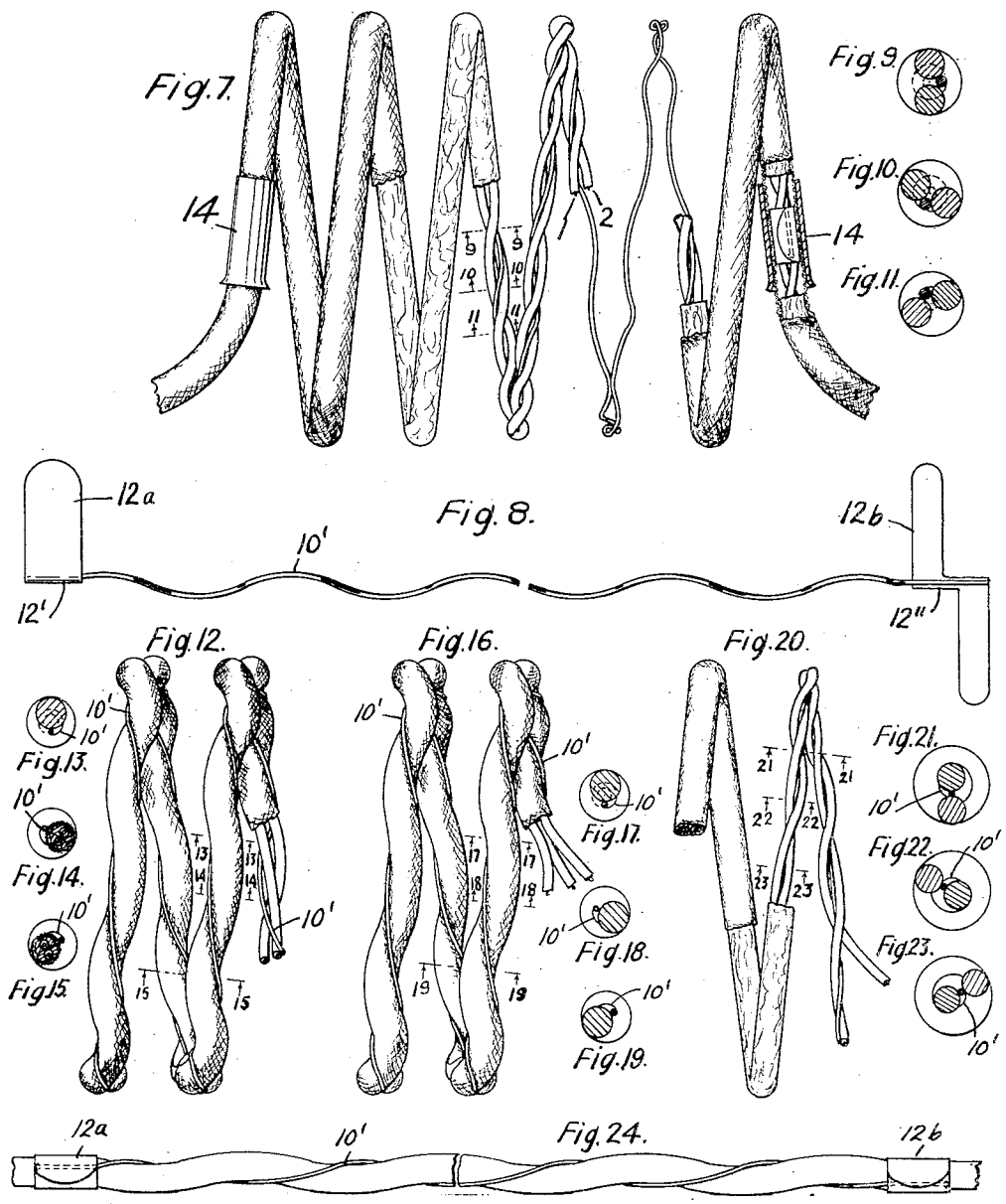
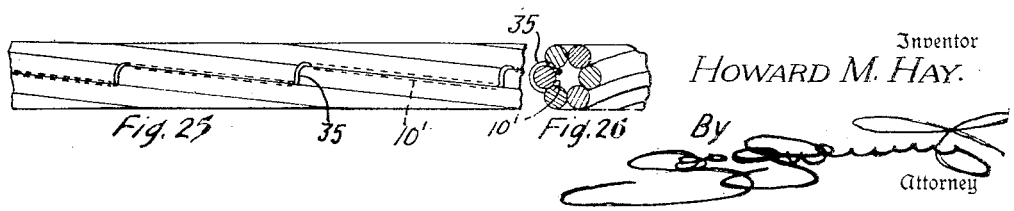
Inventor
HOWARD M. HAY.
By
Attorney Patented Sept. 5, 1939

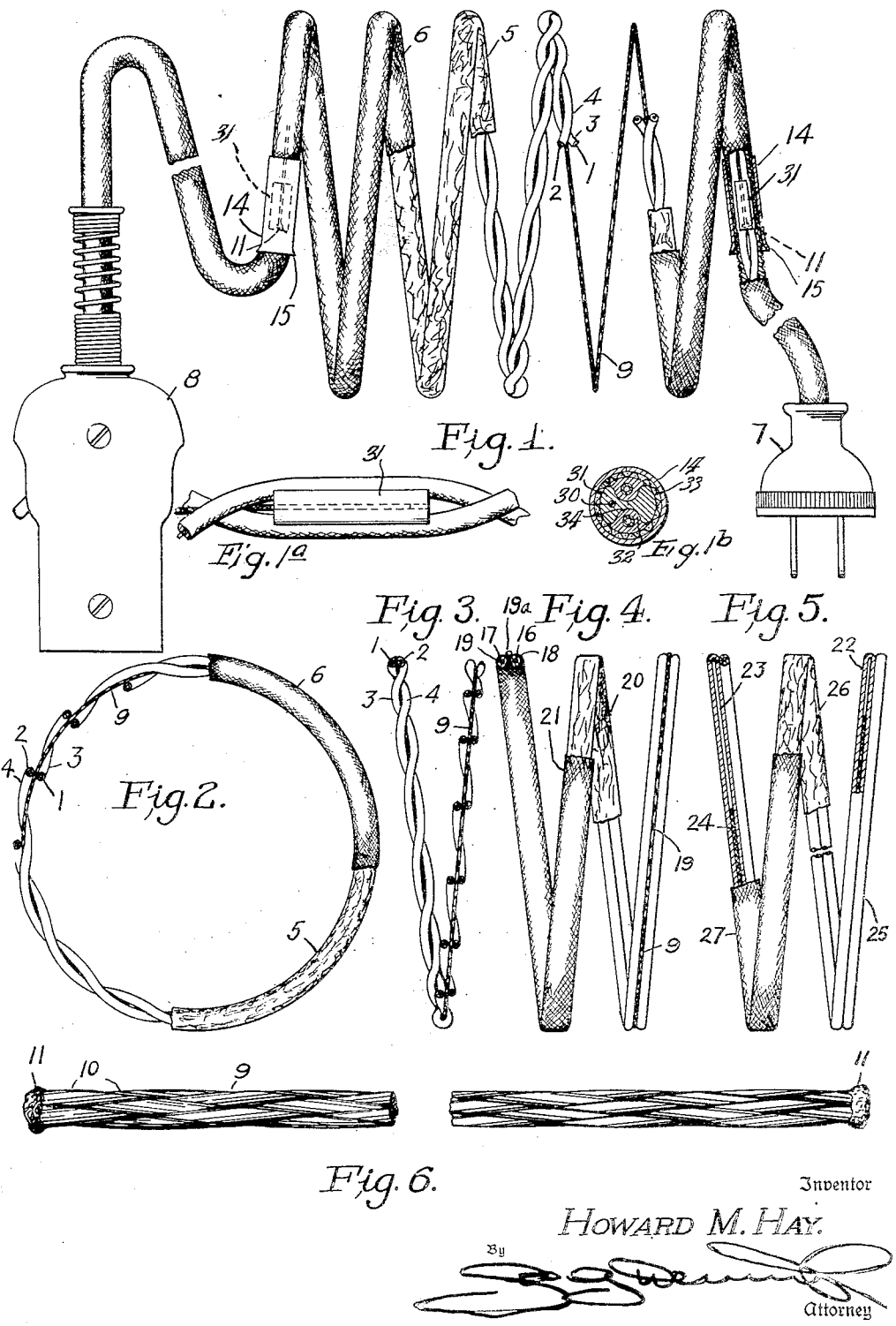

2,171,553

UNITED STATES PATENT OFFICE 2,171,553

COILING CORD AND COILER

Howard M. Hay, Wenonah, N. J., assignor to Isaac Harter, New York, N. Y.

Application September 22, 1933, Serial No. 690,522

12 Claims. (Cl. 174—69)

My invention is an improved coiling cord and coiler providing for the circumvolution under normal conditions of the conductors for supplying electricity to a portable appliance but permitting extension of the conductors up to their full length upon movement of the appliances relative to a plug, socket or other fixed source of current supply.

My improvements are particularly designed to prevent or minimize torque and resulting fatigue, thereby increasing the life of the cord and coiler; to so assemble the cord and coiler that the coiler cannot work loose or away from the cord, and is inconspicuous or invisible; to prevent the sections thereof from contacting with one another or surfaces over which the cord is moved, thereby avoiding the click of metal on metal when the coiler cord is contracted and preventing marring or scratching of the furniture surfaces; to minimize friction between the coiler and cord; to eliminate projecting parts, to effectually circumvolute the cord with a minimum of tension and provide a smooth action in both extending and contracting the cord.

When any straight line, such as a wire conductor or cord, is circumvoluted and then extended axially, there results a twist of the line about its own axis of 360° for each circumvolution drawn out. This twist about the axis of a line imparts a torque causing permanent fatigue due to the permanent displacement of the molecular structure or stretching beyond the elastic limit. If, however, the line be given a sinuous or anfractuous contour in addition to its circumvolution and within each circumvolution, then the elongation of the line in the direction of the axis about which it is circumvoluted may be effected without destructive torque or twisting of the line about its own axis since the torsional force is converted into bending and flexing movements between the line sections.

In the preferred embodiment of my invention, both the coiling and coiled members consist of circumvolutions, each of which is sinuous or anfractuous so that destructive torque is eliminated from or minimized in all of the members of the coiling cord. Sinuosity may be imparted to the coiled members by twisting the conductors embodied in the cord about one another or about a heart formed by the anfractuous coiler, or sinuosity may be imparted to the conductors or cord as a unit by winding them about an axis offset from the axis of the cord by intertwining with the cord an anfractuous coiler having an inside diameter less than the outside diameter of the cord taken as a unit. The sinuosity of the curves per circumvolution of the coiler is preferably obtained by spiralling the coiler wire about an axis outside the periphery of the wire itself and the coiler may consist of a single strand or of a multiplicity of strands preferably intertwined together, as, for instance, by braiding. When the coiler is formed of circumvolutions of plaited or braided wires, the stress is imposed upon the bends of each strand by the axial extensions of the coiler and the resulting tendency to distortion is opposed by stresses imposed upon the bends of other strands, and when the forces tending to extend the circumvolutions axially are released, the strands will react upon one another and restore the circumvolutions to their normal position and condition.

For many uses it is desirable that the conductors and coiler be sheathed within a braided cover, and, in such constructions, the sinuous circumvolutions of a multi-stranded coiler preferably constitute a heat or core for sinuous circumvolutions of electrical conductors. But one or more single strand coilers may have the circumvolutions thereof so bent anfractuously as to lie in the groove between conductors, or a multi-strand coiler having anfractuous circumvolutions may be disposed in such groove. The groove is preferably formed on a rather long pitch by twisting the conductors in a soft lay. In either form of construction, the coiler has its ends fixed relatively to the conductors by suitable fasteners intermediate of the ends of the conductors, and the conductors, coiler and fasteners may be housed within a flexible cover.

In the application of my improvements to a cord having conductors which are already sheathed, a single or multi-strand coiler is used having each circumvolution formed of wire bent around an axis with an inside diameter less than the outside diameter of the cord to be coiled. The application of such coiler to a cord bends the cord into circumvolutions in each of which the cord is twisted sinuously about an axis offset from the axis of the cord.

For special types of cords, such for instance as the heavy duty cords required for some portable tools, the wire of the coiler in addition to being circumvoluted and wound helically may be formed into loops adapted to receive strand sections of adjacent cord conductors, such loops preferably having mouths opening axially and their perimeters projecting outwardly toward the circumferences of the circumvolutions. The coiler sections intermediate the loops are so housed in such instance between the conductors so that the coiler sections housed between the conductors are freely movable independently of the heavy rubber sheathing in which the conductors are embedded after twisting.

In special forms of cords the coiler may be used as one of the conductors or as a ground auxiliary thereto.

My improvements are primarily characterized by the provision of an appliance cord having one or more sheathed or insulated flexible conductors and a coiler having a plurality of circumvolutions each formed of a helix of spring wire, the helix having a diameter less than the external diameter of the cord, or each circumvolution being formed of sinusoidally stranded wire forming a core.

When a coiler spirally wound in each circumvolution is laid around a cord having a diameter not greater than the internal diameter of the helix and the cord is stretched straight, the entire strain is resisted only by the circumvoluting action of the coiler and the strength of the stretched cord itself, whereas when the circumvolutions of cord are themselves helixed around a center line extending longitudinally of the cord and the helixes of the coiler lie in the interstice of such cord, then the helixes of the wire resist the deformation of the helixes of the cord. Consequently, the cord cannot be drawn perfectly straight and a breaking strain applied thereto without overcoming the resistance of the helixes of the coiler as well as overcoming the circumvoluting action thereof. In practice, in order to secure the resistant action of the helixes, as well as the circumvolutions of the coiler, I have found that it is necessary that the pitch of the helix be not less than four times its internal diameter and the pitch is preferably about nine times such diameter.

Where a stranded core is used, the ends thereof are preferably held together and engaged in a recess in an anchoring device or the ends may be held together by the anchoring device.

The characteristic features and advantages of my improvements will further appear from the following description and the accompanying drawings of illustrative embodiments thereof.

In the drawings, Fig. 1 illustrates the application of my improvements to an ironing cord, parts being broken away to show the interior construction; Fig. 1a is a fragmentary view showing on a larger scale the means for anchoring the end of the coiler shown at the right hand end of the cord of Fig. 1; Fig. 1b is a transverse sectional view through the conductors and anchoring means shown in Fig. 1a. Fig. 2 is a side elevation of one of the circumvolutions shown in Fig. 1, with part broken away to show the interior construction; Fig. 3 is an end view, partly in section, of one of the circumvolutions shown in Fig. 1 with the sheathing removed; Fig. 4 is a fragmentary elevation showing the application of my improvements to a cord having parallel conductors, parts being removed to show the interior construction; Fig. 5 is a fragmentary elevation showing the application of my invention to a cord in which the coiler forms one of the conductors; Fig. 6 shows on a greatly enlarged scale the construction of a coiler embodying my improvements applied to the conductors in Figs. 1 to 5, inclusive; Fig. 7 is a side elevation of an ironing cord having my improvements applied thereto in the form of a single strand coiler; Fig. 8 is an elongated view of the coiler shown in Fig. 7; Fig. 9 is a transverse sectional view on the line 9—9 of Fig. 7; Fig. 10 is a transverse sectional view on the line 10—10 of Fig. 7; Fig. 11 is a transverse sectional view on the line 11—11 of Fig. 7; Fig. 12 is a fragmentary view of the sheathed cord having a coiler of the type shown in Fig. 8 exteriorly applied thereto; Fig. 13 is a transverse sectional view on the line 13—13 of Fig. 12; Fig. 14 is a transverse sectional view on the line 14—14 of Fig. 12; Fig. 15 is a transverse sectional view on the line 15—15 of Fig. 12; Fig. 16 is a fragmentary side elevation of a coiler having parallel conductors with a coiler of the type shown in Fig. 8 applied thereto; Fig. 17 is a transverse sectional view on the line 17—17 of Fig. 16; Fig. 18 is a transverse sectional view on the line 18—18 of Fig. 16; Fig. 19 is a transverse sectional view on the line 19—19 of Fig. 16; Fig. 20 is a fragmentary side elevation of a cord having a coiler of the type shown in Fig. 8 applied to one of the conductors thereof; Fig. 21 is a sectional view taken on the line 21—21 of Fig. 20; Fig. 22 is a transverse sectional view taken on the line 22—22 of Fig. 20; Fig. 23 is a transverse sectional view taken on the line 23—23 of Fig. 20; Fig. 24 is a detached view of the conductors with coiler thereon shown in Fig. 20, the conductor straightened out; Fig. 25 is a fragmentary view of a multi-conductor cord having the coiler connected to each conductor; and Fig. 26 is a part sectional perspective view of the cord coiler shown in Fig. 25.

As illustrated in Figures 1 to 3, and 6, inclusive, my improvements are applied to an appliance cord suitable for supplying current to an iron or other appliance and comprises a pair of conductors 1 and 2 each surrounded by an insulating sheath 3 and 4. The conductors are twisted together in a relatively long or soft lay and are housed individually within asbestos wrappings 5, which are preferably drawn into a smooth cylindrical contour before being housed within the braided sheath 6. The ends of the conductors may have fixed thereto suitable fittings such as the plugs 7 and 8.

In accordance with my invention as embodied in the foregoing figures, the insulated conductors are twisted around a core 9 which is formed of a plurality of strands 10, which are braided or coiled together so that each anfractuous strand forms a helix around a center line running longitudinally of the core, which core is itself circumvoluted so as to bend the core into a series of loops lying close to one another.

The internal diameter of the helix formed by each strand 10 is less than the external diameter of the core 9 as well as less than the external diameter of the cord which the core is designed to coil. Each strand 10 passes around the longitudinal center line or axis of the core 9 one or more times in each circumvolution of the core, and each of the conductors passes around the core a plurality of times in each loop formed by the circumvoluting action of the core. Consequently, when the cord is stretched out against the action of the circumvoluting coiler neither the conductors 1 and 2 nor the strands 10 are subjected to excessive torque or molecular distortion and consequently do not become fatigued, and the interlacing of the strands 10 causes each strand to tend to act on the others to return them to normal anfractuous circumvoluting position.

The ends of the strands 10 forming the core 9 are united together as by fusion to form lumps or balls 11.

As illustrated in Figure 4, the coiler shown in Fig. 6 may be applied to a cord comprising the parallel conductors 16 and 17 individually insulated by the sheathes 18 and 19 and forming a groove or interstice 19a between them in which lies the convoluted core 9 which is held in place and concealed from view by the knitted sheath 21. The ends of the coiler 9 may be secured in the same manner as illustrated in Figure 1.

If desired, a stranded coiler 9, such as shown in Fig. 6, may be made of metal which is a good conductor, such as beryllium copper alloy, and used as one of the conductors for such section of the cord as it is desired to have coiled or circumvoluted. When the coiler 9 is used as a conductor as well as a coiler, it may, as shown in Fig. 5, be conductively joined by solder or the like to the ends of non-coiling conductor sections 22 and 23 and housed in insulation 24. Such a circumvoluting conductor may be used to coil other non-coiling insulated conductors, such as 25, by connecting the circumvoluting conductor with the non-coiling conductor by means of a sheath 27.

As illustrated in Figures 7 to 11, inclusive, the cord consisting of insulated twisted conductors 1 and 2 shown in Fig. 1 may be coiled by a single strand of 10' instead of the multiplicity of strands previously used. In such case the strand 10' is preferably made of thicker gauge spring wire than the strands 10 and is bent anfractuously to form a helix having an internal diameter less than the external diameter of the helix described by the insulated conductors 1 and 2. The helix formed by the spring wire 10' is preferably of the same pitch as the interstice or groove formed by the insulated conductors 1 and 2 and in each circumvolution formed by the coiler 10' the helix formed thereby passes a plurality of times about the center line of the cord lying between the conductors 1 and 2. When a single strand coiler is used, its ends may be secured relatively to the conductors by collars formed by bending the sheet metal strips 12a and 12b around the insulated conductors 1 and 2 within the sheathing. Each strip 12a or 12b contains a groove 12' and 12" for the reception of the end of the coiler 10'. The strip 12b has oppositely disposed wings which may be bent reversely around the insulated conductors 1 and 2. The collars formed by the strips 12a and 12b are overlaid by external collars 14 having belled ends mounted upon the sheathing.

A coiler of the type shown in Fig. 8 may be applied exteriorly to a sheathed cord containing twisted conductors as shown in Figures 12 to 15, or to a sheathed cord containing parallel conductors as shown in Figures 16 to 19.

When a coiler of the type shown in Fig. 8 is applied to a sheathed cord having twisted conductors, the pitch of the helix of the coiler is preferably the same as the pitch of the interstice formed by the twisted insulated conductors and the internal diameter of the helix formed in the coiler 10' is less than the external diameter of the sheathed cord. The coiler consequently bends the cord into a helix spiraling about the center line extending in the direction of the cord, and the coiler lies within the circumference formed by such helix. Both the coiler and the cord pass a plurality of times around such center line in each convolution into which the cord is bent by the coiler. The anfractuous or helical bends of both the coiler and the cord in each convolution minimizes the torque to which they are subjected when the cord is drawn out to its length and the disposition of the coiler in the interstices of the helixes of othe cord prevent such coiler from contacting with or marring the surface upon which the cord may rest.

As illustrated in Figures 16 to 19, inclusive, a coiler of the type shown in Fig. 8 is applied to a cord having insulated conductors arranged in parallel. The internal diameter of the helix formed by the coiler 10' is less than the external diameter of the cord. Consequently, the cord is bent by the coiler into a helix which spirals repeatedly about a center line extending longitudinally of the cord in each circumvolution into which the cord is bent by the coiler. The coiler lies at all times within the circumference formed by the helixes into which the cord is bent, and consequently does not come into contact with the polished surface of the furniture on which the appliance, such as a telephone, to which the cord is attached, may stand, and the helixing of both the coiler and the cord in each circumvolution thereof minimizes torque therein when the cord is drawn out to its full length.

As illustrated in Figures 20 to 24, inclusive, a coiler of the type shown in Fig. 8 may be applied to a single insulated conductor having an external diameter larger than the internal diameter of the helix formed by the coiler. As illustrated in Fig. 24, the application of such a coiler bends the insulated conductor into the form of a helix having a circumference larger than the helix formed by the coiler, and both the cord and the coiler pass repeatedly about a center line extending longitudinally of the cord in each circumvolution into which the cord is bent by the coiler. As illustrated in Fig. 20, a second conductor may be twisted with the conductor shown in Fig. 24 and the twisted conductors sheathed in a sheath to form a coiling cord whose diameter is greater than the diameter of the helix formed by the coiler, which latter lies between the two conductors. As both the conductors and the helix are spiraled repeatedly around a center line extending longitudinally of the cord in each circumvolution, the torsion and fatiguing of the conductors and coiler in stretching the cord out to its full length are minimized.

Either the coiler shown in Fig. 6 or the coiler shown in Fig. 8 may be anchored relatively to the twisted conductors of a cord by the insertion of the ends of the coilers into recesses 30 formed in keepers consisting of slugs 31 of soft rubber or soft metal as illustrated in Figures 1a and 1b. These keepers contain channels 32 for the reception of the insulated conductors and have curved flanges 33 projecting transversely from the web 34. The curved surfaces of the flanges 33 are substantially coincident with the circumference of the circle drawn around the conductors. Anchorages are covered by the sheath of the cord and may be overlaid by external collars 14.

As illustrated in Figures 25 and 26, a coiler of the type shown in Fig. 8 may be applied to a multi-conductor cord designed to have a rubber sheathing applied thereto, such as are used for supplying current to heavy tools. In this adaptation of the invention the coiler may have loops 35 bent therein which are sequentially snapped over adjacent insulating conductors of the cord.

As hereinbefore specifically set forth, my invention is susceptible of embodiment in a variety of forms but in each of such embodiments each circumvolution of the coiler is anfractuously, and preferably spirally, bent around a center line extending longitudinally of the cord and lying wholly within a circumference formed by the cord, viz., within the periphery of the sheath or within one of the helixes into which each circumvolution of the cord is bent when there is applied thereto an external coiler bent in a helix of less diameter than the cord and having a pitch at least four times its diameter. The ends of the coilers may likewise be secured by a plurality of anchorages but in each instance the end of the coiler is within the anchorage and does not project from the body of the cord.

Having thus described my invention, I claim—

1. The combination with a conductor cord having a plurality of electrical conductors, each such conductor having a plurality of termini, a protective cover for all of said conductors, cord coiling means within the cover, said means being continuously coiled in the same direction, and said coiling means having a terminus intermediate the termini at the opposite ends of said conductors, said cover having a normally uncoiled end section for taking up axial twist imparted to the cover by pulling the coiler axially, and means within the cover for protecting said conductor cord from injurious contact with said coiler terminus.

2. The combination with a conductor cord having a plurality of electrical conductors, each conductor having a plurality of termini, a protective cover for all said conductors, cord coiling means within the cover and continuously coiled in the same direction, said coiler having both its termini intermediate the termini at the opposite ends of said conductors, said cover having a normally uncoiled end section projecting beyond the termini of said coiler and taking up, between the termini of the coiler and the termini of the conductors, axial twist imparted to the cord by pulling the coiler axially, and means gripped between the conductors aforesaid for protecting the cord from injurious contact with the coiler termini.

3. The combination with an appliance cord comprising a plurality of insulated conductors and a circumvoluting coiler therefor, of means for positioning an end of said coiler relative to said conductors and comprising a keeper having a web disposed between and positioned by said conductors.

4. The combination with an electric appliance cord including a plurality of conductors and a circumvoluting coiler for coiling said cord, of means for positioning an end of said coiler relatively to said cord and comprising a keeper disposed between said conductors and having concave surfaces for the reception thereof and flanges lying in the interstices formed by said conductors.

5. The combination with an electric appliance cord containing a plurality of insulated conductors having a space between them, of a circumvoluting coiler for coiling said cord and comprising an anfractuous spring lying in said space between said insulated conductors.

6. The combination with an electric appliance cord containing an insulated electric conducting means, of a circumvolution coiler coiling said cord, each circumvolution being anfractuously bent around a center line extending longitudinally of said cord and said coiler lying wholly within the circumference formed by the insulation of said means, each anfractuous bend of the coiler forming a spiral which has a diameter less than the diameter of the cord per se and each circumvolution of the coiler bending a length of cord forming a circumvolution into the shape of a helix curled bodily about a center.

7. A circumvoluting coiler for coiling a cord and comprising a spring spiralled repeatedly in each circumvolution about a center line extending longitudinally of the coiler and having a pitch not less than four times the diameter of the helix formed by the spiralling of said spring about said center line.

8. The combination with an electric appliance cord containing an insulated electric conductor, of a circumvoluting coiler coiling said cord and comprising a plurality of spring strands each spiralled repeatedly around one another and around a center line extending longitudinally of said cord in each circumvolution of said collar.

9. A circumvoluting coiler for coiling a cord and comprising a plurality of spring strands spiralled repeatedly in each circumvolution about a center line extending longitudinally of said coiler, said strands normally intertwisting with one another.

10. The combination with an electric appliance cord containing a plurality of insulated conductors twisted together, of a circumvoluting coiler for coiling said cord and comprising a plurality of spring strands each repeatedly spiralled in each circumvolution about a center line extending longitudinally of the cord, said strands normally intertwisting with one another.

11. The combination with an electric appliance cord comprising a plurality of insulated conductors twisted together, of a circumvoluting coiler for coiling said cord and comprising a spring anfractuously bent in each circumvolution and forming a core about which said insulated conductors are twisted.

12. The combination with an electric appliance cord containing an insulated electric conductor, of a circumvoluting coiler for coiling said cord and comprising a plurality of spring strands each bent repeatedly around a center line extending longitudinally of said cord and within a circumference described by said cord, the multistrands of said coiler being twisted together and said coiler lying at the axial heart of the cord.

HOWARD M. HAY.